United States Patent
Tomlinson et al.

[11] Patent Number: 5,634,426
[45] Date of Patent: Jun. 3, 1997

[54] ABSORPTION DEPLETION INDICATORS FOR ANESTHETIC GAS ADMINISTRATION SYSTEMS

[76] Inventors: Bruce Tomlinson; Judy Tomlinson, both of 4109 Saltwater Blvd., Tampa, Fla. 33619; Sandy McDonald; Lee McDonald, both of 34 Royal Oak Dr., Barrie, Ontario, Canada, L4M 4S6

[21] Appl. No.: 393,088

[22] Filed: Feb. 22, 1995

[51] Int. Cl.$^6$ .................................. G01K 11/12
[52] U.S. Cl. .................... 116/207; 374/162; 128/205.23
[58] Field of Search ..................... 73/295, 25.01; 374/54, 150, 162, 45, 160, 161; 116/217, 206, 216, 207; 128/205.28, 205.23; 426/88

[56] References Cited

U.S. PATENT DOCUMENTS

| | | | |
|---|---|---|---|
| 2,889,799 | 1/1959 | Korpman | 116/207 |
| 3,002,385 | 2/1961 | Wahl et al. | 374/106 |
| 3,716,337 | 2/1973 | Jones | 73/25.01 |
| 3,877,411 | 4/1975 | MacDonald | 116/207 |
| 3,926,368 | 12/1975 | Geen | 236/41 |
| 4,232,552 | 11/1980 | Hof et al. | 374/106 |
| 4,280,441 | 7/1981 | McNeely | 116/219 |
| 4,326,514 | 4/1982 | Eian | 128/202.22 |
| 4,392,102 | 7/1983 | Sugalski et al. | 116/216 |
| 4,457,253 | 7/1984 | Manske | 116/216 |
| 4,459,046 | 7/1984 | Sprig | 116/216 |
| 4,468,137 | 8/1984 | Hilsum et al. | 374/161 |
| 4,743,398 | 5/1988 | Brown et al. | 374/161 |
| 5,218,834 | 6/1993 | Major et al. | 374/150 |
| 5,360,002 | 11/1994 | Smith | 128/205.28 |

FOREIGN PATENT DOCUMENTS

| | | |
|---|---|---|
| 610761 | 12/1960 | Canada . |
| 1100419 | 5/1981 | Canada . |
| 1119474 | 3/1982 | Canada . |
| 1141990 | 3/1983 | Canada . |
| 1166941 | 5/1984 | Canada . |
| 2168259 | 6/1986 | United Kingdom ............ 128/205.28 |

*Primary Examiner*—Scott Cummings
*Assistant Examiner*—Andrew Hirshfeld
*Attorney, Agent, or Firm*—Haugen and Nikolai, P.A.

[57] ABSTRACT

Absorption depletion indicators for anesthetic gas administration systems which, in a closed or semi-closed system of anesthetic gas administration comprising a canister held absorbent for carbon dioxide, the improvement is characterized in that an indicator is provided for the canister for determining when the carbon dioxide absorbent is exhausted, the indicator is in the form of a wax temperature indicator calibrated permanently to change colour at a temperature of the absorbent indicative of exhaustion of the absorbent due to carbon dioxide absorption.

9 Claims, 1 Drawing Sheet

ABSORPTION DEPLETION INDICATORS FOR ANESTHETIC GAS ADMINISTRATION SYSTEMS

FIELD OF THE INVENTION

The present invention relates to indicators for carbon dioxide absorbent depletion in closed or semi-closed anesthetic gas administration systems.

BACKGROUND OF THE INVENTION

The closed system administration of anesthetics requires complete rebreathing of anesthetic mixtures. Because a patient consumes oxygen and produces carbon dioxide, the exhaled gas has had part of its oxygen extracted and replaced by carbon dioxide. Carbon dioxide must be removed and oxygen added to the gas mixture before it is recirculated to the patient. Similarly in semi-closed systems there is partial rebreathing and possible accumulation of carbon dioxide must be monitored.

It has been conventional over the years to use alkalies contained in canisters in fluid communication with the anesthetic administration system to remove carbon dioxide from the gases being administered to the patient (including anesthetic and oxygen). Absorbtion of carbon dioxide by such alkalies is essentially a chemical reaction i.e. neutralization. Carbonic acid is formed by the combination of carbon dioxide with water. The base is the absorbent and at the present time the only satisfactory absorbents are the hydroxides of the alkaline metals, potassium, sodium, lithium and of the alkaline earths: barium, stratum, calcium and magnesium. The hydroxides of the alkaline metals are more active chemically than the alkaline earths, but are very caustic and highly hygroscopic. As a result, mixtures of these compositions have been developed for clinical purposes, for example soda lime, which is basically porous limestone granules that are activated for carbon dioxide absorption by the addition of caustics i.e. the alkaline metals. More particularly soda lime is a mixture of sodium, potassium and calcium hydroxides which, by ionization furnish OH-ions. Sodium hydroxide and potassium hydroxide make up about 4.5% of the mixture and calcium hydroxide about 95%. Small amounts of silica are added to make the mixture hard and to minimize fragmentation and alkaline dust formation. In soda lime, silica amounts to about 0.2%. Another commonly used absorbent is baralyme. This is a mixture of about 20% barium hydroxide and about 80% calcium hydroxide.

Until now, chemical indicators have been incorporated into the granules of absorbents. These are dyes that change colour when exposed to different pH values resulting as carbon dioxide becomes "absorbed" and neutralizes the basic absorbents. The acid form of the indicator has one colour and the basic form another. Indicators such as ethyl violet or Clayton yellow are dyes that change colour at a pH below 12. As carbonic acid accumulates the indicator on the absorbent granules will change colour visibility. In baralyme, indicators such as mimosa (pink) and ethyl violet are used.

The problem with the use of such indicators is that they must be observed for indicator change during active use. Otherwise, as they stand, when the anesthetic delivery system is inactive, they tend to revert to their original colour. Thus, the remaining capacity of absorption of the absorbent becomes unknown. With reuse of the system, the indicator will change colour again quickly, particularly where there was little remaining capacity of absorption in the absorbent. Even when indicators are used in absorbents, exhaustion of the absorbent and corresponding incomplete carbon dioxide removal may be recognized only upon the patient developing hypertension or other visible signs.

Patents of general background interest to the subject matter of the present invention include U.S. Pat. No. 4,457,253 of Manske issued Jul. 3, 1984 which teaches a capillary tube temperature indicator, Canadian Patent No. 610,761 of Davidson et al issued Dec. 20, 1960 which teaches a wax spot for packaged frozen foods which wax spot melts at a predetermined temperature and disappears from visibility indicating that the food may have been previously thawed, U.S. Pat. No. 4,326,514 of Eian issued Apr. 27, 1982 that describes a respirator carbon dioxide absorbent indicator in the form of a colorimetric indicator in sheet form contained in a respirator canister, Canadian Patent No. 1,100,419 of Jones issued May 5, 1981 which teaches an end of service indicator for organic vapour/gas respirator cartridges wherein a color change agent is contained in the absorbent bed of the respirator; Canadian Patent No. 1,166,941 of De Blauwe issued May 8, 1984 which teaches a thermochromic composition used as a warning indicator that a certain maximum safety temperature has been achieved and Canadian Patent No. 1,141,990 of Sewell et al issued Mar. 1, 1983 which teaches an electronic indicator to monitor the capacity of a carbon dioxide absorbent to absorb carbon dioxide.

It is an object of the present invention to provide a more reliable indicator and method of indicating exhaustion or developing exhaustion of an absorbent in such anesthetic gas administration systems.

SUMMARY OF THE INVENTION

In accordance with the present invention an improved indicator for indicating absorbent exhaustion is provided for closed or semi-closed anesthetic gas administration systems using canister held absorbents for carbon dioxide. More particularly, the present invention relates to an indicator for the canister for determining when the carbon dioxide is exhausted which indicator is calibrated permanently to change colour at a temperature of the absorbent indicative of exhaustion of the absorbent due to carbon dioxide absorption.

In a preferred embodiment of the present invention, the indicator is made up of a plurality of wax temperature indicators selected to change colour at a range of different temperatures, those wax temperatures being carried on a film, and visible on or within the canister carrying the absorbent.

The use of such a temperature changing dye provides a more reliable indication, for reasons which will be described in more detail hereinafter, of the extent of exhaustion of the absorbent in the canister. Unlike previously used indicator dyes which are based on pH, the indicators of the present invention do not revert to an earlier colour and hence provide a permanent indication of the degree of exhaustion of the absorbent.

BRIEF DESCRIPTION OF THE DRAWINGS

These and other advantages of the invention will become apparent upon reading the following detailed description and upon referring to the drawings in which.

Figure 1:
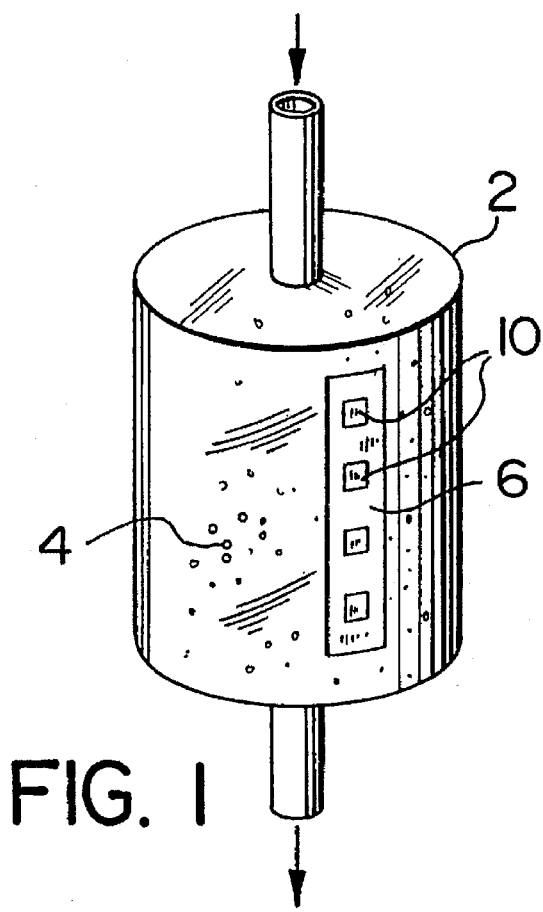
FIG. 1 is a perspective view of an absorbent canister in an anesthetic gas administration system incorporating an indicator in accordance with the present invention.
Figure 2:
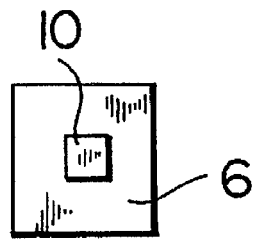
FIGS. 2, 3, 4 and 5 are plan views of variations of indicators in accordance with the present invention.

While the invention will be described in conjunction with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE DRAWINGS

In the drawings similar features have been given similar references numerals.

The present invention is based upon the fact that the neutralization reaction which occurs with the absorbent, as carbon dioxide is "absorbed", is an exothermic reaction, and, during administration of anesthetic in a closed or semi-closed system, there is a build-up of heat in the canister which is proportional to the degree of exhaustion of the absorbent and its decreasing ability to absorb carbon dioxide. If heat production goes to say 50° C., the absorbent is no longer effective. Thus, in order to provide a more reliable indication of the degree of exhaustion of the absorbent over the pH indicators which had been previously used, the use of wax temperature indicators was turned to.

Such wax temperature indicators usually comprise liquid crystals mixed in a wax carrier. Liquid crystals are a class of chemical compounds which, within a certain temperature range, possess properties of a state of matter which is intermediate between a liquid and a solid. Certain forms of liquid crystals are sensitive to temperature. The molecules of such liquid crystals form spiral structures which twist with temperature changes. As the molecules twist they refract different colours. As a result liquid crystals can be formulated to change to certain colours at specified temperatures. Certain liquid crystals, of the type used in the present invention, are known as cholesteric liquid crystals. They have the ability to selectively scatter the component colors of light and, at a given temperature, they appear as the same colour. Their rate of change from color to color, as well as the exact temperatures at which a specific color appears, can be made constant. Thus, these liquid crystals have been used as temperature sensing devices in widely varied applications. Thus for example U.S. Pat. No. 3,877,411 of MacDonald issued Apr. 15, 1975 teaches a bolt having on its head a disc impregnated with a chemical substance that changes colour at a given temperature. Canadian Patent No. 1,119,474 of Warner issued Mar. 9, 1982 teaches a similar structure. U.S. Pat. No. 2,889,799 of Korpman issued Jun. 9, 1959 teaches the application of a heat modifiable dye stuff on a tacky adhesive tape that changes colour at exposure to an elevated temperature for determining whether or not medical instruments are sterilized.

Figure 3:
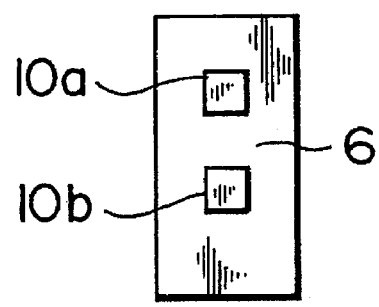
Figure 4:
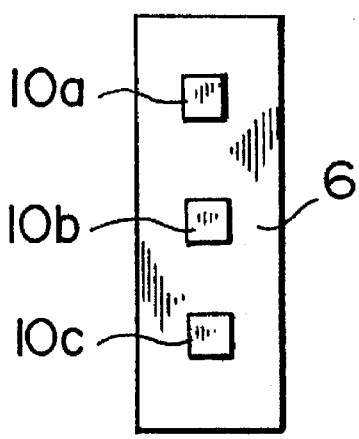
Figure 5:
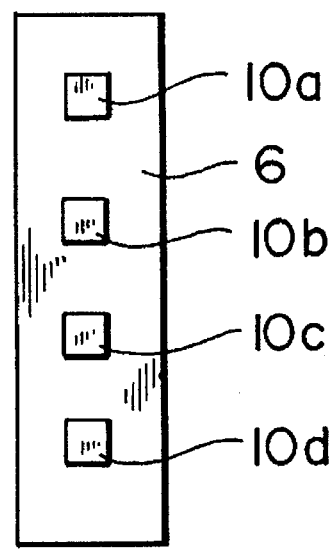

In accordance with the present invention, as illustrated in FIG. 1, a canister 2 containing an absorbent 4 may, for example, have transparent walls and contain within a strip 6 of film material on which is placed one or more small wax squares 10. The wax square comprises a wax temperature indicator in which is mixed for example a cholesteric liquid crystal composition that is calibrated to change colour permanently at a particular temperature, e.g. 50° C., to indicate exhaustion of the absorbent because of carbon dioxide absorption. One or more wax indicator spots 10 may be provided on each strip, as indicated in FIGS. 2 to 5. For instance in FIG. 2, the spot 10 is adapted to change colour at about 50° C., spot 10(a) in FIG. 3 is adapted to change at about 50° C. and 10(b) at about 45° C. In FIG. 4, spot 10(c) is adapted to change temperature at about 40° C. and in FIG. 5, spot 10(d) is adapted to change temperature at about 35° C. Thus, the strips 6 can be adapted to have one event (one temperature indication) or multiple events as indicated.

Thus there has been provided in accordance with the invention an absorption depletion indicator for anesthetic gas administration systems that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention is:

1. A combination of an indicator and a canister for a closed or semi-closed system of anesthetic gas administration, the cacnister having a carbon dioxide absorbent held therein, the indicator being provided for the canister for determining when the carbon dioxide absorbent is exhausted, the indicator being in the form of at least one wax temperature indicator calibrated permanently to undergo change of colour at a temperature of the absorbent indicative of extensive exhaustion of the absorbent due to carbon dioxide absorption, the absorbent being selected from the group consisting of soda lime and baralyme.

2. The combination according to claim 1 wherein the wax temperature indicator is calibrated to change colour at about 50° C.

3. The combination according to claim 1 wherein said at least one wax temperature indicator comprises a plurality of wax temperature indicators, one of said indicators calibrated to undergo change of colour at about 50° C. and another of said indicators calibrated to undergo change of colour at about 45° C.

4. The combination according to claim 3 wherein said plurality of wax temperature indicators comprises a further wax temperature indicator calibrated to change colour at a temperature of about 40° C.

5. The combination according to claim 4 wherein said plurality of wax temperature indicators comprises a further wax temperature indicator calibrated to change colour at a temperature of about 35° C.

6. The combination according to claim 5 wherein each said wax indicator is a small wax spot on a strip of film material.

7. The combination according to claim 3 wherein each said wax indicator is a small wax spot on a strip of film material.

8. The combination according to claim 4 wherein each said wax indicator is a small wax spot on a strip of film material.

9. The combination according to claim 1 wherein the wax indicator is formed from cholesteric liquid crystals held in wax.

* * * * *